Figure 1:
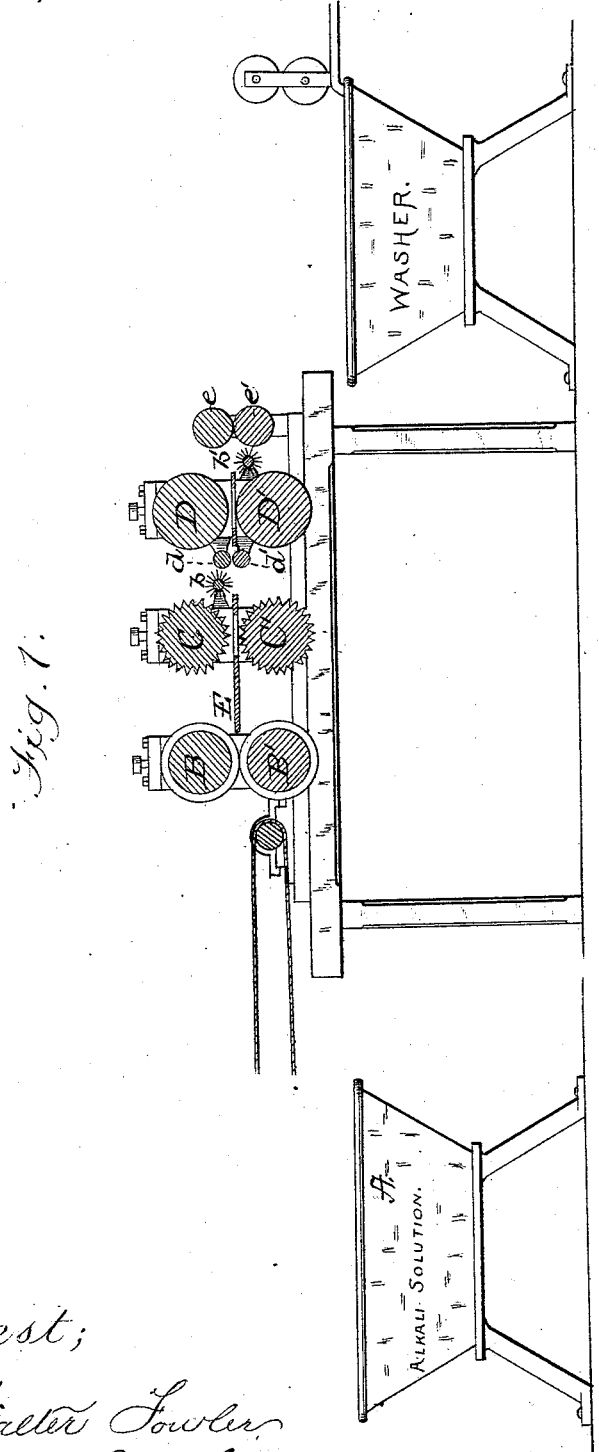

(No Model.) 3 Sheets—Sheet 1.

R. R. ROBERTS.
METHOD OF AND MEANS FOR TREATING VEGETABLE MATTER.

No. 279,435. Patented June 12, 1883.

(No Model.) 3 Sheets—Sheet 2.
R. R. ROBERTS.
METHOD OF AND MEANS FOR TREATING VEGETABLE MATTER.
No. 279,435. Patented June 12, 1883.

Attest;
T Walter Fowler
Lemuel Bundey

Inventor;
Robert R. Roberts.

(No Model.) 3 Sheets—Sheet 3.

R. R. ROBERTS.
METHOD OF AND MEANS FOR TREATING VEGETABLE MATTER.

No. 279,435. Patented June 12, 1883.

Attest:
Walter Fowler,
Lemuel Bursley

Inventor:
Robert R. Roberts

UNITED STATES PATENT OFFICE.

ROBERT R. ROBERTS, OF NEW ORLEANS, LOUISIANA, ASSIGNOR OF ONE-HALF TO M. J. WINE, OF WASHINGTON, DISTRICT OF COLUMBIA.

METHOD OF AND MEANS FOR TREATING VEGETABLE MATTER.

SPECIFICATION forming part of Letters Patent No. 279,435, dated June 12, 1883.

Application filed November 14, 1882. (No model.)

*To all whom it may concern:*

Be it known that I, ROBERT R. ROBERTS, a citizen of the United States of America, residing at New Orleans, in the parish of Orleans and State of Louisiana, have invented certain new and useful Improvements in Method of and Means for Treating Vegetable Matter; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a process of and means for treating the leaves of the *Bromelia-fibrista*, pita, and other fibrous plants to obtain therefrom fibers which are well adapted for use in the industrial arts.

My invention consists in an improvement in the art of treating the leaves of fibrous plants, the same consisting in subjecting the leaves to an alkali solution, then passing them between a series of rollers for decortication, then washing the fiber from impurities, and finally passing the fiber between hot rollers.

My invention also consists in a vessel containing an alkali solution for preparing the leaves, in combination with a series of rollers for breaking or cutting the outer coating of the fiber leaves longitudinally and transversely, and means for removing the broken coating.

My invention further consists in the combination with a vessel containing an alkali solution, of a series of rollers for decorticating fibrous leaves passed between them, and comb or brush rollers.

My invention further consists in the combination, with a vessel containing an alkali solution, of a series of rollers adapted to decorticate fibrous leaves passed between them, comb or brush rollers, and a washer.

My invention further consists in the combination, with a vessel containing an alkali solution, of a series of rollers for decorticating fibrous leaves, comb or brush, a washer, and a pair of hot rollers.

My invention further consists in the novel construction and combination of parts as will be hereinafter more fully set forth.

Figure 2:
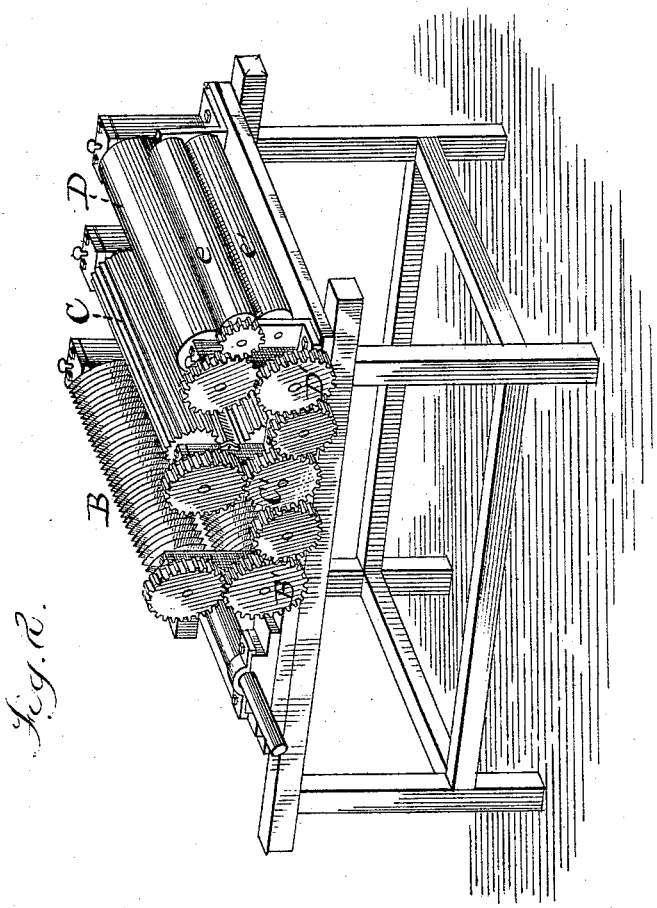
Figure 3:
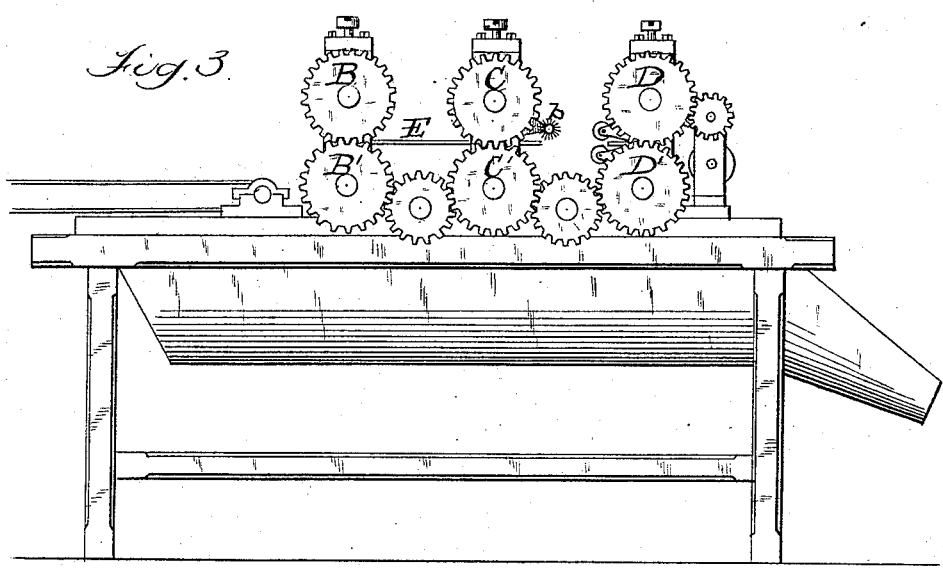
Figure 4:
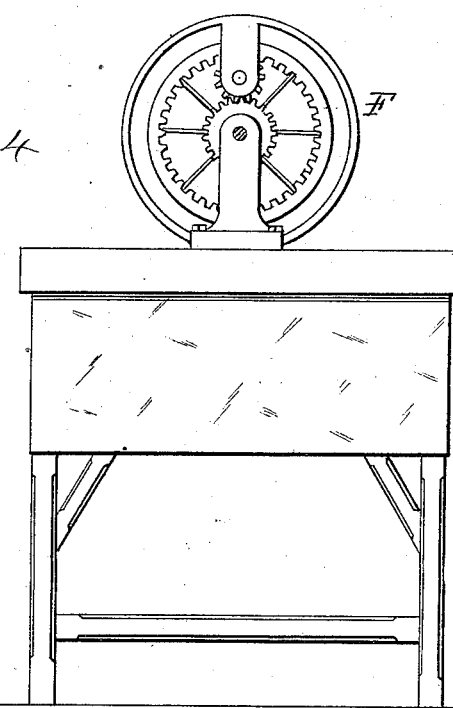

In the annexed drawings, Figure 1 is a side view, with the decorticating-rollers in section, of an apparatus for carrying out my process. Fig. 2 is a perspective view of the decorticating-rollers mounted on a suitable frame. Fig. 3 is a side view of the same, and Fig. 4 is a side view of a revolving washer.

In carrying out my process of treating the leaves of fibrous plants either in the green or dry state, the former condition being preferred, I employ a vessel, A, of any suitable shape and construction, to contain an alkali solution, preferably potash or concentrated lye, for boiling the leaves from five to twelve hours, according to the nature of the leaves, for the purpose of softening them. From the alkali bath the leaves are fed forward by means of an endless belt and passed lengthwise between a pair of geared rollers, B B', each formed with a transverse roughened surface or cutter for the purpose of breaking up the leaves longitudinally. These rollers may be formed of a plurality of cutters, strung upon shafts and secured thereon by suitable means. The leaves are next passed lengthwise between the geared rollers C C', which are formed with longitudinal flutes or corrugations to break or cut the coating of the fiber leaves transversely without injuriously affecting the fiber. After the leaves have been broken longitudinally and transversely they are then fed forward, and their upper surface submitted to the action of a revolving brush, $b$, for removing the broken and gashed coating and at the same time to a combing out of the pulpy matter. While this action is in progress the forward portion of the leaves are held taut by the small tension-rollers $d\ d'$, and as they are advanced or fed through they are subjected to a heavy pressure between the geared smooth rollers D D', for the purpose of pressing all juice or sap from the vegetable matter. As the leaves pass from the rollers D D' they are acted upon on the under side by a revolving brush, $b'$, arranged below the table E, and in rear of the roller D', as shown fully in Fig. 1 of the drawings, for the purpose of removing the under coating and combing the pulpy or glutinous matter from the fibers, and during this operation the fiber is held by the rollers e e'. The leaves are now ready for washing, for the purpose of removing the alkali and any remaining traces of glutinous substance or of vegetable juices, and for this purpose they are carried by a slotted endless revolving apron or inclined slide into a washer. This washer preferably consists of an outer cylinder, F, (see Fig. 4,) with longitudinal corrugations on its inner surface, with a central shaft, which is also corrugated, the cylinder and shaft being provided with the necessary gearing to cause them to revolve in opposite directions, to produce cross-currents of the hot liquid, which suspends the fiber and pass through the fibrous mass which has been placed within. Of course I do not intend to limit myself to any particular machine for washing the fiber, as this can be done in a great variety of ways. After the fiber has been thoroughly washed, it is further treated in a bath of dilute ammonia to which has been added a small quantity of vegetable oil, preferably cotton-seed oil, to prevent injury to the fine texture of the fiber. The object of the ammonia bath is to neutralize the alkali, and the cotton-seed oil to preserve the strength of the fiber. The fluid is removed from the fiber by means of a common centrifugal machine revolving at a very high rate of speed.

The vessel for the ammonia bath and centrifugal machine are not shown in the drawings; but they should be arranged in rear of the washer. The individual fiber is next subjected to a heavy pressure between properly-adjusted hot rollers, after which it is combed and baled ready for market. The various rollers and brushes for acting upon the material are suitably mounted upon frames, so as to admit of ready adjustment to and from each other by means of set-screws or their equivalents, and are driven at a desired speed by a train of gear-wheels and belts.

From the foregoing description and reference to the drawings it will be seen that the coating of the vegetable matter is cut or broken longitudinally by the first set of rollers, cut or broken transversely by the second set, and crushed by the third set of rollers.

I reserve the right to vary the construction and arrangement of parts composing the apparatus without departing from the spirit of the invention.

What I claim as my invention, and desire to secure by Letters Patent, is—

1. An improvement in the art of treating the leaves of fibrous plants, which consists in subjecting the leaves to an alkali solution, then passing them between a series of rollers for decortication, then washing the fiber from impurities, and passing the fiber between hot rollers, substantially as described.

2. The within-described improvement in the art of treating the leaves of fibrous plants to obtain fiber, the same consisting in subjecting the leaves to an alkali solution, then passing them between a series of rollers for decortication, then washing the impurities from the fiber, then subjecting the fiber to a bath of ammonia mixed with vegetable oil, then drying the fiber, and finally combing it, substantially as described.

3. In means for treating the leaves of fibrous plants, the combination, with a vessel containing an alkali solution, of a series of rollers for breaking or cutting the outer coating of the leaves longitudinally and tranversely, and means for removing the coating, substantially as described.

4. In means for treating the leaves of fibrous plants, the combination, with a vessel containing an alkali solution, of a series of rollers for decorticating the leaves, and combing-rollers, substantially as described.

5. In means for treating the leaves of fibrous plants, the combination, with a vessel containing an alkali solution, of a series of rollers for decorticating the leaves, combing-rollers, and a washer, substantially as described.

6. In means for treating the leaves of fibrous plants, the combination, with a vessel containing an alkali solution, of a series of rollers for decorticating the leaves, combing-rollers, a washer, and a pair of hot rollers.

7. The combination of a pair of rollers formed or provided with a plurality of transverse cutters or breakers, and a pair of rollers formed or provided with longitudinal cutters or breakers, whereby the coating of vegetable matter passed between the rollers is gashed longitudinally and transversely, substantially as described.

8. The combination of a pair of rollers formed or provided with a plurality of transverse cutters or breakers, a pair of rollers formed or provided with longitudinal cutters or breakers, and a pair of smooth or crushing rollers, substantially as described.

ROBERT R. ROBERTS.

Witnesses:
T. WALTER FOWLER,
H. B. APPLEWHAITE.